(12) United States Patent
Lubetkin

(10) Patent No.: US 11,321,433 B2
(45) Date of Patent: May 3, 2022

(54) NEUROLOGICALLY BASED ENCRYPTION SYSTEM AND METHOD OF USE

(71) Applicant: EYETHENTICATE, LLC, Boca Raton, FL (US)

(72) Inventor: Austin H. Lubetkin, Boca Raton, FL (US)

(73) Assignee: EYETHENTICATE, LLC, Boca Raton, FL (US)

( * ) Notice: Subject to any disclaimer, the term of this patent is extended or adjusted under 35 U.S.C. 154(b) by 404 days.

(21) Appl. No.: 16/119,443

(22) Filed: Aug. 31, 2018

(65) Prior Publication Data

US 2019/0073460 A1 Mar. 7, 2019

Related U.S. Application Data

(60) Provisional application No. 62/553,415, filed on Sep. 1, 2017, provisional application No. 62/666,922, filed on May 4, 2018.

(51) Int. Cl.
*G06F 21/32* (2013.01)
*G06F 21/45* (2013.01)
*H04L 9/32* (2006.01)

(52) U.S. Cl.
CPC .............. *G06F 21/32* (2013.01); *G06F 21/45* (2013.01); *H04L 9/3231* (2013.01)

(58) Field of Classification Search
CPC ......... G06F 21/32; G06F 21/45; H04L 9/3231
See application file for complete search history.

(56) References Cited

U.S. PATENT DOCUMENTS

| | | | | |
|---|---|---|---|---|
| 7,986,816 | B1* | 7/2011 | Hoanca | G06K 9/00597 |
| | | | | 382/115 |
| 8,988,350 | B2* | 3/2015 | Karmarkar | G06F 21/316 |
| | | | | 345/158 |
| 9,367,677 | B1* | 6/2016 | Adhami | G06F 21/32 |
| 9,424,411 | B2* | 8/2016 | McCloskey | G06F 21/32 |
| 10,007,771 | B2* | 6/2018 | Oguz | G06K 9/00885 |
| 10,546,183 | B2* | 1/2020 | Rodriguez | G06K 9/00335 |
| 10,568,557 | B2* | 2/2020 | Bonneh | A61B 5/163 |

(Continued)

OTHER PUBLICATIONS

Arsham, "Confidence Intervals for Two Populations", 2015, pp. 1-4, http://home.ubalt.edu/ntsbarsh/Business-stat/otherapplets/Esteeml.htm (Year: 2015).*

(Continued)

*Primary Examiner* — Hee K Song
(74) *Attorney, Agent, or Firm* — Maxwell L. Minch; Maxwell L Minch Esq. PA

(57) ABSTRACT

A system and method for providing authenticating user access to an access controlled device such as computers, mobile devices, or tablets. The present disclosures describes a novel method and system for eye tracking performed through the execution of computer software on a nontransitory computer-readable medium to measure neurological impulses through physiological expressions of the user. These measurements are unique to each user and therefore ideal for the use in the field of encryption and decryption. This novel system can potentially make mobile devices significantly more secure. Preferably, the system comprises a user interface and a camera.

17 Claims, 3 Drawing Sheets

(56) References Cited

U.S. PATENT DOCUMENTS

| | | | | |
|---|---|---|---|---|
| 2006/0039686 | A1* | 2/2006 | Soh | G06T 7/254 |
| | | | | 396/18 |
| 2013/0336547 | A1* | 12/2013 | Komogortsev | A61B 5/117 |
| | | | | 382/117 |
| 2014/0020089 | A1* | 1/2014 | Perini, II | G07C 9/37 |
| | | | | 726/19 |
| 2014/0125581 | A1* | 5/2014 | Chitkara | G06F 3/013 |
| | | | | 345/156 |
| 2015/0347734 | A1* | 12/2015 | Beigi | H04L 9/3231 |
| | | | | 713/155 |
| 2017/0161976 | A1* | 6/2017 | Tsou | G07C 9/33 |
| 2017/0300686 | A1* | 10/2017 | Shyu | G06K 9/00604 |
| 2017/0346817 | A1* | 11/2017 | Gordon | G02B 27/0172 |
| 2017/0365101 | A1* | 12/2017 | Samec | A61B 3/09 |
| 2018/0131692 | A1* | 5/2018 | Katz-Oz | H04L 29/06809 |

OTHER PUBLICATIONS

Valsecchi et al. "Saccadic and smooth-pursuit eye movements during reading of drifting texts", 2013, pp. 1-43, Journal of Vision Aug. 2013, vol. 13, 8. doi:https://doi.org/10.1167/13.10.8 (Year: 2013).*

* cited by examiner

NEUROLOGICALLY BASED ENCRYPTION SYSTEM AND METHOD OF USE

CROSS-REFERENCE TO RELATED APPLICATIONS

The present application claims priority of U.S. Provisional patent application No. 62/666,922 filed on May 4, 2018, and U.S. Provisional patent application No. 62/553,415 filed on Sep. 1, 2017, the contents of each is herein incorporated by reference.

FIELD OF THE INVENTION

The present invention relates to methods and techniques of generating passwords for access controlled devices and identifying users based on unique neurological responses.

BACKGROUND OF THE INVENTION

The use of biometric features is well known in the field of passwords to access and encrypt access controlled devices. While not as ubiquitous as alphanumeric passwords, the use of fingerprints and facial recognition for user recognition and device access has increased exponentially. A clear example is the use of fingerprint sensors on laptops and other mobile devices. Other technologies have attempted to use other biometric features as the basis for user identification. For instance, voice recognition systems are based on comparing the syntactical and phonological traits from a previously recorded expression from the user with a current expression attempting to duplicate the previously recorded expression. These systems are consistently undermined by using reproductions of the validated user's vocal expressions.

Equally, early facial recognition systems were based on comparing a pre-existing image or set of images assigned to a specific user and a new image or set of images at the time the user was requesting access to the device. Improvements on this system used measurements of physical features, such as the distance and size of the eyes, ears, nose, and mouth to generate a more nuanced security profile of the user.

More recently, the industry has seen the introduction of additional hardware to complement facial recognition systems with infrared based measurements. These systems project a predetermined infrared pattern on the users face and use the user facing camera to create a depth map of the user's face. These systems represent a significant improvement in the field of biometric recognition but are not without their drawbacks. For instance, in the case of image-only facial recognition, a mere picture of the user can be enough to induce a positive identification of the user. In the more complex systems, sculptures and 3D printed facemasks have been used to gain access to the devices. Additionally, the IR based systems increase hardware and software requirements that ultimately impact the cost and the performance of the device. Fundamentally, these technologies are all susceptible to subversion by duplicating the user's patent physical feature by either electronical or physical means. Thus, there remains an unmet need for an authentication method that is difficult to be subverted through mimicking or duplication of physical features.

SUMMARY OF THE INVENTION

The present invention provides systems and methods for authenticating user access to an access controlled device through the measurement of neurological inputs of a user when responding to a visual stimulus. Analysis of unique neurological responses to stimuli for distinguishing humans has largely been ignored in biometric authentication systems. When explaining the mechanics of the eyes Alexander Crum Brown noted "[w]e fancy that we can move our eyes uniformly, that by a continuous motion like that of a telescope we can move our eyes along the sky-line in the landscape or the cornice of a room, but we are wrong in this. However determinedly we try to do so, what actually happens is, that our eyes move like the seconds hand of a watch, a jerk and a little pause, another jerk and so on; only our eyes are not so regular, the jerks are sometimes of greater, sometimes of less, angular amount, and the pauses vary in duration, although, unless we make an effort, they are always short. During the jerks we practically do not see at all, so that we have before us not a moving panorama, but a series of fixed pictures of the same fixed things, which succeed one another rapidly." Alexander Crum Brown, THE RELATION BETWEEN THE MOVEMENTS OF THE EYE AND THE MOVEMENTS OF THE HEAD 4-5 (May 13, 1895). Additionally, the authentication method can augment existing facial recognition technology for added security without additional hardware. An example of how this augmentation can be incorporated is looking at the changes in micro-expressions of facial features in how a user responds to a reading which would be recorded at similar points in the reading. The amount of matching micro-expressions recorded by the facial recognition algorithm can be an additional layer of secondary authentication. By leveraging each person's unique reading mechanics, a much more significant level of protection can be achieved.

DETAILED DESCRIPTION OF THE INVENTION

Figure 1:
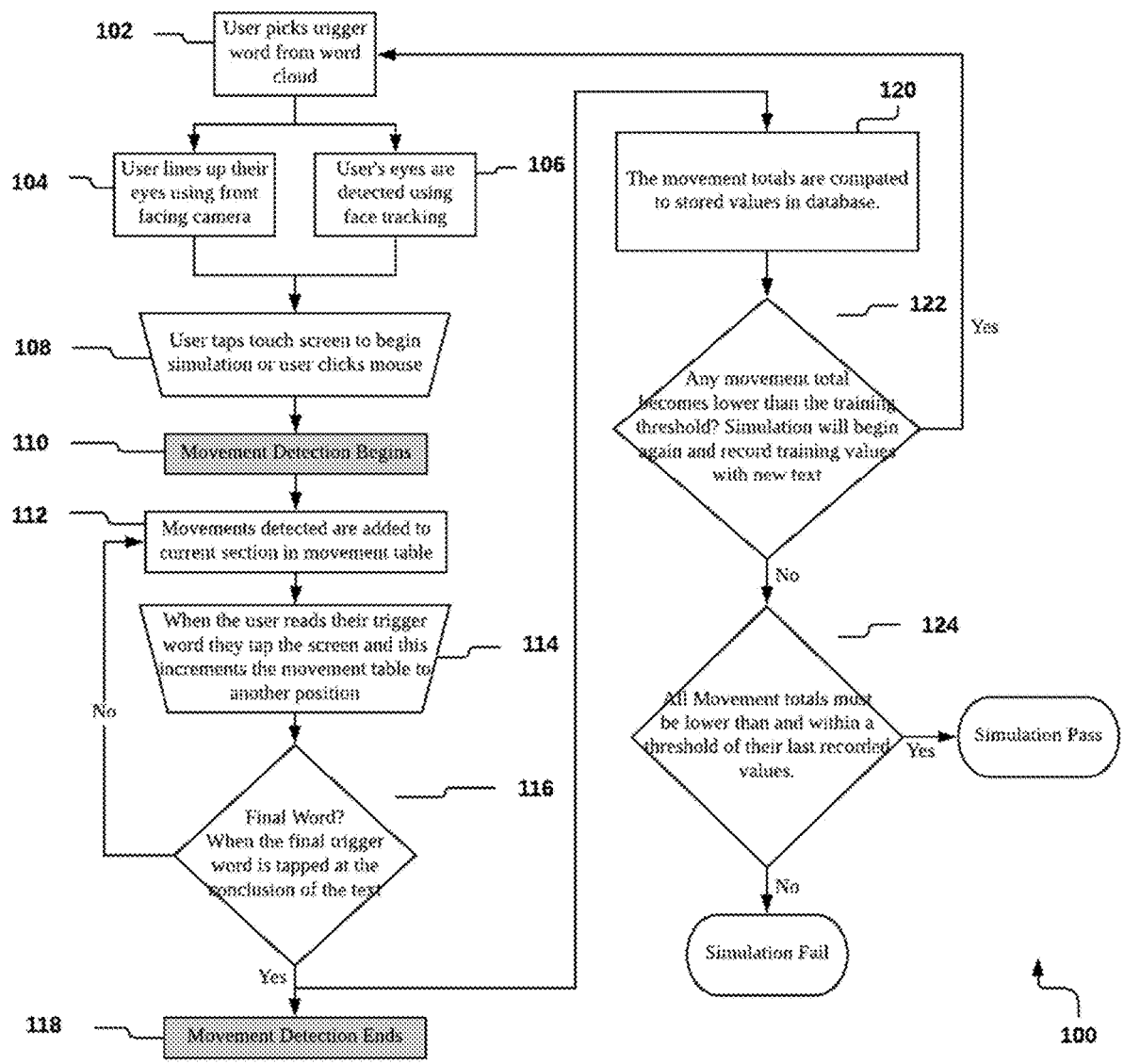
FIG. 1, shows a flow diagram of a method for identifying a user in accordance with embodiments of the present invention.

The following detailed description is merely exemplary in nature and is no way intended to limit the scope of the invention, its applications, or uses, which may vary. The invention is described with relation to the non-limiting definitions and terminology included herein. These definitions and terminology are not designed to function as a limitation on the scope or practice of the invention but are presented for illustrative and descriptive purposes only.

The present invention provides for a novel method and system for authenticating user access to an access controlled device. It is envisioned that an access controlled device encompasses any electronic device capable of requiring user authentication; including, but not limited to, computers, mobile devices, tablets, doors. It is also envisioned that the present invention may also serve to provide authentication for the encryption and decryption of files and documents, and as login for websites.

In accordance with at least one embodiment, access to the access controlled device is performed through the execution of computer software on a nontransitory computer-readable medium such as RAM, ROM, Flash, SSD, or magnetic drive. The nontransitory computer-readable medium is connected to a camera and a user interface. In at least one embodiment of the invention, the user interface consists of a screen.

It is appreciated that the method for authenticating user access begins with the execution by the computer of software instructions stored in the nontransitory computer-readable medium with the purpose of displaying an image on the user interface. In a non-limiting example, the image displayed may contain a text arrangement, such as a short story, a paragraph, a sentence, a word cloud, or any combination with or without an organizational structure. Next, the computer records and stores to memory a plurality of images of the user from the camera while the user is looking at the image presented on the user interface.

The computer will analyze the plurality of images to identify one or more neurological responses from the user. The one or more neurological responses may correspond to any one physiological characteristic of the user. By way of a non-limiting example, the plurality of images are analyzed to determine bursts of movement in the user's eyes, ears, nose, mouth, or in any combination of the preceding. Without being bound to any particular theory, it is believed that any voluntary or involuntary physiologically expressed movement resulting from a neurological impulse is capable of serving as a unique identifier within the present invention. In at least one embodiment of the invention specific to the movement of the eyes, the computer will compare the plurality of images to determine changes in luminosity values from one image to the next, thereby calculating whether the eyes have moved, at which speed, and in which direction.

The plurality of acquired values are compared with a plurality of baseline values (previously recorded using the same method used to obtain the acquired values) to derive a confidence value based on the results. In a non-limiting example, the confidence value might indicate the comparative speed and direction of the acquired values with respect to the baseline values. Lastly, the system grants access to the user if the confidence value is above a target confidence value. Conversely, the system denies access to the user if the confidence value is less than the target confidence value.

FIG. 1 provides a flow diagram of a method for authenticating user access to an access controlled device 100 according to a preferred embodiment of the present invention. First, an image is displayed on a user interface of the access controlled device containing the words that will make up the text arrangement. In a non-limiting example, the text arrangement is a reading that could any of a short story, a paragraph, a sentence, a word cloud, or a combination thereof. In order to capture normal reading speed consistently, it is preferable that the reading chosen avoids or limits words considered to be gibberish and/or not interesting to a reader as they might cause the reader to skim the reading material, which isn't a preferred normal reading speed. The reading material chosen as text arrangement can be mildly interesting but, preferably not too interesting, as to cause the reader to go into memorizing or learning gear. Though not limiting, it is preferred that the reading material selected is as inoffensive as possible; and that has that has widespread appeal but is not shocking or unusual. However, it is envisioned that there are other characteristics for the reading material that could also be used and are considered within the scope of this disclosure.

Figure 3:
FIG. 3, shows a screenshot of an exemplary display text in accordance with at least one embodiment of the present invention.

In at least one embodiment of the invention, a word cloud is used to assist with the user authentication, where the word cloud is an asynchronous composition that can be scanned over while not interfering or preparing the reader for the material. In such embodiment, the user picks a trigger word from the word cloud 102. See also FIG. 3. While the user is looking at the user interface of the access controlled device the user lines up their eyes with the front facing camera of the access controlled device 104. Preferably, the user can line their eye up with an oval preferably disposed in the corner display of the front facing camera. In an alternative embodiment, the user's eyes are detected by the access controlled device using commercially available face tracking software 106.

In at least one embodiment, while maintaining focus on the trigger word, the user interacts with the access controlled device to provide an input 108. By way of non-limiting examples, said input could consist of either pressing a button in a keyboard or in a mouse, using a hand gesture, using a verbal command, touching the user interface, or combinations thereof. Said input then prompts the controlled access device to begin movement detection 110. (A non-limiting example of movement detection 200 is further explained below). In at least one embodiment, the movement detection can track one or more neurological or physiological responses including movement by the user's eyes, movement by the user's ears, movement by the user's nose, movement by the user's mouth, or combinations thereof.

In at least one embodiment, the movement detected is then stored in memory in a movement value table. In at least one embodiment, the movement detection tracks the saccades of the eyes as the eyes focus on the trigger word contained in the word cloud and then stores the value of the saccade in memory in a movement value table. Every time the user reads the trigger word, the user interacts with the access controlled device to provide an input causing the access controlled device to increment the position in the movement value table in memory 114 and store new saccade values. In a non-limiting example, steps 112 and 114 are repeated a predetermined amount of times. In another non-limiting example, where the text arrangement is a short story, a paragraph, or a sentence, steps 112 and 114 are repeated after the reading the conclusion of the text or until the final trigger word is shown 116.

In at least one embodiment, the movement value totals in the movement value table are then compared to baseline movement values 120 previously recorded by the user upon first access to the access controlled device. In at least one embodiment, the movement values are averaged. In some embodiments, the baseline movement values are also averaged. In at least one embodiment. a statistical confidence interval is calculated between the mean movement value and the mean baseline value. The calculated confidence value is then compared to a preset value, previously set by a system administrator.

In at least one embodiment, because as more data becomes available it becomes easier for new values to fall in the confidence interval thus becoming exponentially harder to pass the authentication with each attempt, a higher confidence is required. The adjustment for the higher confidence as additional values become available provides a secondary authentication since the consistency in the change of the data will allow the continued passing of the confidence test. Thus if there is a sudden change in the reading data or a spike inconsistent with a sequential reading the authentication will fail.

In a non-limiting example, the authentication method compares the rate of change using statistical analysis between each individual section of the reading. The system is looking for a correlation coefficient of the functional regression of the data that is consistent between iterations. Additionally, there can be a sensitivity value set by the system administrator and if the correlation coefficient changes more than the sensitivity value between iterations the authentication fails. A process running the background of the device can analyze the rate of change of reading data associated with text material shown a few but not many times on the device to provide a sensitivity value estimated for that specific user.

Because a user reads a text faster and with fewer eye movements after each attempt, subsequent movement values must be higher than the baseline movement values or the previously stored movement values. Therefore, if any movement value total is lower than the training threshold the process will begin again 122. Additionally, if all previous movement values are lower than and within a predetermined threshold from the latest recorded value 124 then access is granted to the access controlled device.

Figure 2:
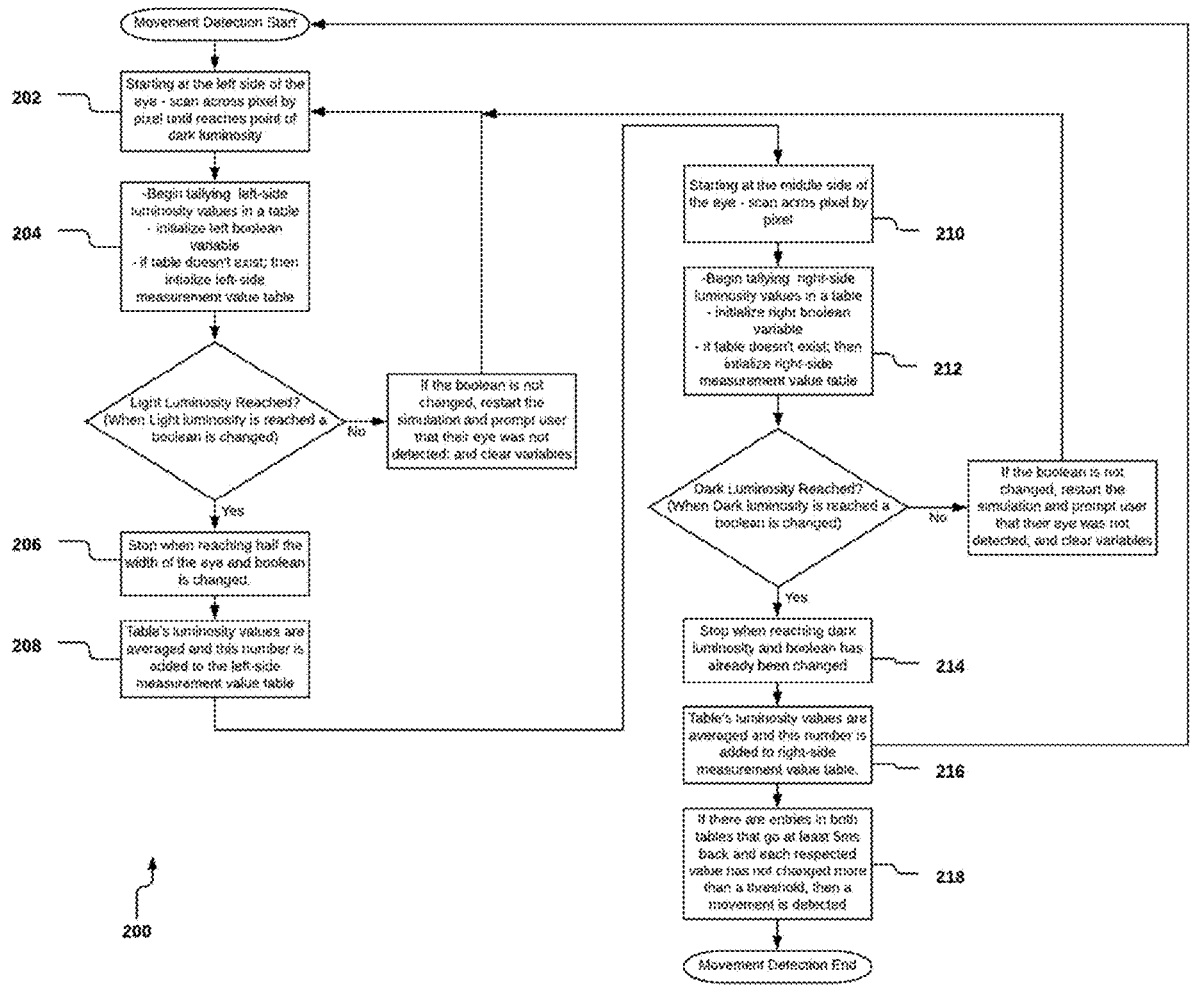
FIG. 2, shows a flow diagram of a method for detecting eye movement of a user in accordance with embodiments of the present invention.

FIG. 2 shows a flow diagram of a preferred embodiment of the movement tracking method contemplated above; specifically, for tracking eye movement 200. Movement detection start is prompted by an input from the user. Then, starting at the left side of the eye scan across pixel by pixel the eye until a point of "dark" luminosity is reached 202. The luminosity values are then tallied and a stored in a left-side measurement value table, if no table has been created, a new left-side measurement value table is initialized 204. Simultaneously, a left Boolean variable is also initialized. Once the values indicate that the pixel by pixel scan has reached a point of "light" or "bright" luminosity then the left Boolean variable is changed 206. If the Boolean variable has not changed, the process is restarted, and the user is prompted that the eye was not detected; all variables are cleared. If the Boolean variable has changed, the scan has reached the half the width of the eye. Subsequently, the Boolean is changed. Then, the left-side luminosity values are averaged and stored on the left-side measurement value table 208.

Proceeding from the middle of the eye the system then continues to scan across pixel-by-pixel 210. The luminosity values are then tallied and a stored in a right-side measurement value table, if no table has been created, a new right-side measurement value table is initialized 212. Simultaneously, a right Boolean variable is also initialized. Once the values indicate that the pixel by pixel scan has reached a point of "dark" luminosity then the right Boolean variable is changed. If the right Boolean variable has not changed, the process is restarted, and the user is prompted that the eye was not detected; all variables are cleared. If the right Boolean variable has changed, the scan has reached the end of the eye 214. Subsequently, the right Boolean is changed. Then, the right-side luminosity values are averaged and stored on the right-side measurement value table 216. If there are entries in both tables that go back in time more than a predetermined amount of time and each respected value has not changed more than predetermined threshold (i.e. the values have stabilized) then movement is detected 218. In a non-limiting example, the predetermined amount of time can be 5 milliseconds.

In a non-limiting example, a short story was broken up into four sections (though the number of sections or type of story is not considered limiting). Two of the sections were chosen to be similar small sections while the other two were chosen to be medium and long lengths respectively (though the lengths are not considered limiting). The design was preferably set up to have a control that allowed inaccurate measurements to be invalidated. This control involved checking that the pupil and edges of the eye were reached and included corresponding internal sections of contrasting light and dark luminosity. If the check fails then the user would be prompted that their eye was not and eye detection was restarted.

The user can tap the screen at the beginning and end of the simulation as well as at any time they read their chosen trigger word. For this non-limiting version in each section the number of detected eye movements can be divided by three (though such is not considered limiting) to account for the minimal experimental error while detecting reading. In other non-limiting versions, the system and method can be configured such that all movements are less than and within three of the last detected number of movements of each section. Other configurations can be used and are also within the scope of the disclosure.

The eye movement tracking method described herein can differentiate between the slower normal movements of the eye and the short bursts associated with eye movements while truly reading. If a user tried to replicate eye movements, they would invariably be slower than the short bursts and would fail to be picked up by the disclosed novel system and method for eye tracking. Playing a recording of eye movements is also not feasible, since each time a user reads their sample paragraphs their reading speed increases due to a decrease in the number of eye movements. A recording would stagnate at a point in development and would fail to grow along the path that would secondarily identify a user. Furthermore, this subconscious password would not be compatible with a brute force attack. This is because each attempt would shift the point on the prediction model. Furthermore, this process would need a set limit on the number of attempts to unlock a device.

It is appreciated that several hardware configurations known in the art may be used to fulfill the requirements for the novel system and method herein, which minimally require a screen, a camera unit, an input unit, a storage unit, and software for determining and validating neurological response for performing calculations and measurements.

In a non-limiting example, the input unit prompts the software for determining and validating neurological response to retrieve an image from the storage unit and display it to the user through the screen. Immediately after the software for determining and validating neurological response prompts the camera unit to acquire an image and store it in the storage unit, the software for determining and validating neurological response then determines a plurality of luminosity values from said image to be stored in the storage unit and compared to baseline values to allow or deny access to the access controlled device.

In non-limiting examples, the screen can be manufactured from any number of technologies including, but not limited to thin-film-transistor liquid-crystal display (TFT-LCD), in-plane switching liquid-crystal display (IPS-LCD), a resistive touchscreen liquid-crystal display, a capacitive touchscreen liquid-crystal display, an organic light-emitting diode (OLED) display, or an active-matrix organic light-emitting diode (AMOLED) display.

In alternative embodiments of the present invention, the camera unit could comprise on or more cameras, infrared matrix projectors, or a single infrared LED. Similarly, in alternative embodiments of the present invention, the input unit could be selected from any number of sensors and devices, including, but not limited to a touch screen, a mouse, a button, an accelerometer, or a microphone.

Accordingly, most commonly sold devices can be used for the system and performing the described novel method. Thus, with the disclosed system and method, training can be accomplished through normal device usage. When a device has been unlocked, a process can run in the background gathering measures of reading speed when text is on (displayed) screen. This integrated training keeps the process in line with a user while also eliminating the extended periods of training associated with other subconscious passwords. In a non-limiting example, the disclosed system and method could run on low power iOS devices. However, in many cases, dedicated hardware and high-power applications are preferred for eye tracking.

Other Embodiments

While at least one exemplary embodiment has been presented in the foregoing detailed description, it should be appreciated that the exemplary embodiment or exemplary embodiments are only examples and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the claims and the legal equivalents thereof.

The invention claimed is:

1. A method of authenticating user access to an access controlled device through the execution of computer software on a non-transitory computer-readable medium encoded with said computer software and incorporating a camera in communication therewith, the method comprising:
retrieving one or more text arrangements from a storage unit and displaying said one or more text arrangements on a user interface of said computer;
instructing a user to read said one or more text arrangements;
recording and storing to the storage unit a plurality of images of the user from said camera while said user reads said one or more text arrangements;
analyzing said plurality of images to identify one or more neurological responses from the user to calculate a plurality of acquired values;
comparing the plurality of acquired values with a plurality of baseline values and deriving a confidence value based on the comparison results of said acquired values with said baseline values; and
granting access to the access controlled device if the confidence value is higher than a target confidence value.

2. The method of claim 1, wherein said access controlled device is a mobile device.

3. The method of claim 1, wherein said access controlled device is a computer.

4. The method of claim 1, wherein said one or more text arrangements is a short story, a paragraph, a sentence, a word cloud, or combinations thereof.

5. The method of claim 1, further comprising providing an input prior to recording and storing to memory a plurality of images, wherein said first input is pressing a button, using a hand gesture, using a verbal command, touching the user interface, or combinations thereof.

6. The method of claim 1, wherein said one or more neurological responses is movement by the user's eyes, movement by the user's ears, movement of the user's nose, movement by the user's mouth, or combinations thereof.

7. The method of claim 1, wherein said plurality of acquired values from said plurality of images is luminosity measurements, distances traveled measurements, speed measurements, or a combination thereof.

8. The method of claim 1, wherein the confidence value is calculated by finding the confidence interval between the mean of the acquired values and the mean of the baseline values.

9. The method of claim 1, wherein the target confidence value is preset by a system administrator.

10. The method of claim 1, further comprising repeating the steps of:
retrieving one or more text arrangements from a storage unit and displaying said one or more text arrangements on a user interface of said computer;
instructing a user to read said one or more text arrangements;
recording and storing to the storage unit a plurality of images of the user from said camera while said user reads said one or more text arrangements;
analyzing said plurality of images to identify one or more neurological responses from the user to calculate a plurality of acquired values;
comparing the plurality of acquired values with a plurality of baseline values and deriving a confidence value based on the comparison results of said acquired values with said baseline values;
denying access to the access controlled device if the confidence value is lower than the target confidence value; and
increasing the target confidence value exponentially;
wherein the steps are repeated if either the confidence value is higher than the target confidence value or the target value reaches a sensitivity preset by the system administrator.

11. The method of claim 1, wherein access to the access controlled device is denied if the confidence values is lower than the target confidence value.

12. A method of authenticating user access to an access controlled device through the execution of computer software on a non-transitory computer-readable medium encoded with said computer software and incorporating a camera in communication therewith, the method comprising:
displaying one or more text arrangements on a user interface of said computer;
instructing a user to read said one or more text arrangements;
recording and storing to memory a plurality of images of the user from said camera while said user reads said one or more text arrangements;
detecting the location of the user's eyes from the plurality of images;
receiving a first input from the user;
calculating a first distance value and a first speed value relating to the movement of the user's left and right eyes;
receiving a second input from the user;
calculating a second distance value and a second speed value relating to the movement of the user's left and right eyes;
comparing the first distance value and the second distance value to a baseline distance value and comparing the first speed value and second speed value to a baseline speed value to generate a confidence score; and granting or denying access to the access controlled device based on comparing the confidence score to a threshold value.

13. A system for accessing an access controlled device, comprising:

a screen;

a camera unit;

an input unit;

a storage unit; and a neurological response processing unit, wherein the neurological response processing unit is configured to retrieve one or more text arrangements from the storage unit and display it to the user through the screen, the neurological response processing unit further configured to instruct a user to read said one or more text arrangements, receive one or more images from the camera, and determining a plurality of luminosity values from said image to be stored in the storage unit;

wherein activating input unit initiates a request from the neurological response processing unit to allow or deny access to the access controlled device.

14. The system of claim 13, wherein the screen is selected from a group consisting of: a TFT-LCD, an IPS-LCD, a Resistive Touchscreen LCD, a Capacitive Touchscreen LCD, an OLED Display, and an AMOLED Display.

15. The system of claim 13, wherein the camera unit comprises at least one camera.

16. The system of claim 13, wherein the camera unit comprises at least one camera and at least one infrared projector.

17. The system of claim 13, wherein the input unit is selected from a group consisting of: a touch screen, a mouse, a button, an accelerometer, and a microphone.

\* \* \* \* \*